Dec. 10, 1957  E. F. ENGSTROM  2,815,570
CITRUS FRUIT PEELING DEVICE
Filed July 18, 1955
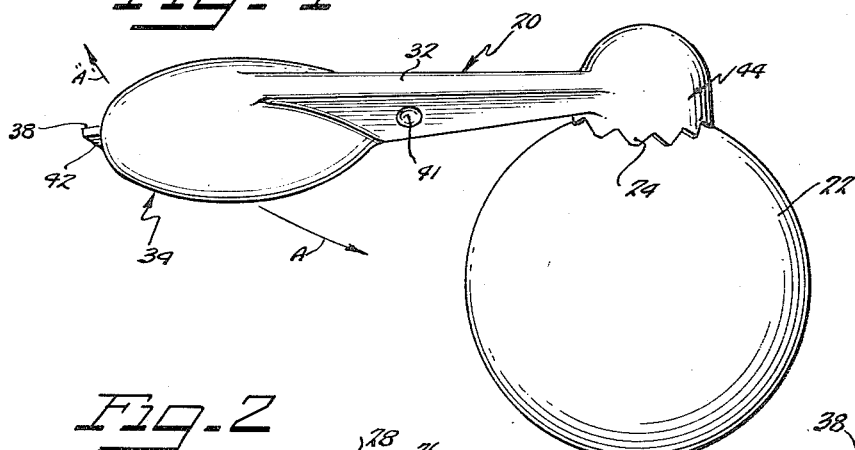
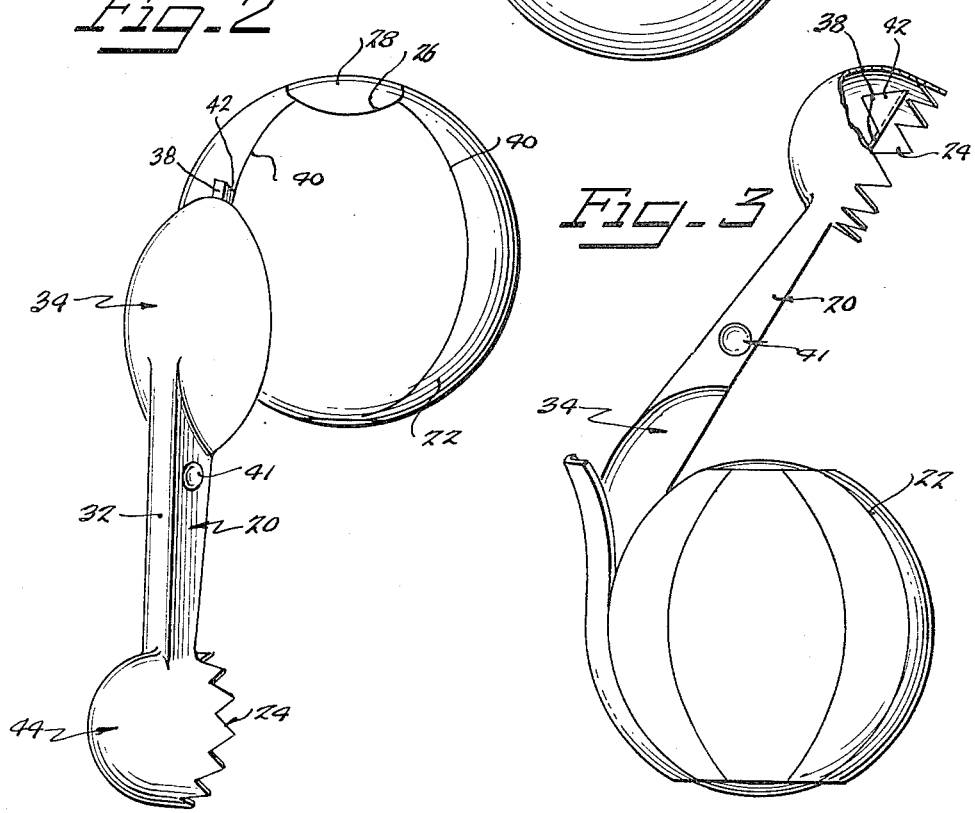
Inventor
ERNST F. ENGSTROM
Atty's.

United States Patent Office 2,815,570
Patented Dec. 10, 1957

2,815,570

CITRUS FRUIT PEELING DEVICE

Ernst F. Engstrom, Maywood, Ill.

Application July 18, 1955, Serial No. 522,712

3 Claims. (Cl. 30—24)

This invention relates to fruit peeling and to fruit peeling devices, and more particularly to a hand tool useful for removing the peel of fruit such as an orange.

Removing the peel from an orange by hand has always been a somewhat awkward and difficult job. Often the segments of the orange are broken into during peeling operation, with a consequent loss of juice and resulting untidiness as juice squirts or runs out onto the operator's hands, face, clothing, and possibly onto a working surface. The task of removing an orange peel by hand may therefore be slow and time-consuming, particularly if the operator uses particular care in an attempt to avoid the above hazards.

It is, accordingly, an object of my invention to provide new and improved means for peeling citrus or like fruit.

A more particular object of my invention is to provide a novel hand tool which may be easily operated to remove the peel from oranges and the like, providing a neat, rapid and generally expeditious removal of the peel without crushing or tearing the meat or membranes of the fruit enclosing the juice.

Another object is to provide a new and inexpensive peeling tool of simple and economical construction, operable in a convenient manner which may be readily learned by a person of little mechanical skill.

A further object of the present invention is to provide a citrus fruit peeling device which is especially suitable for initiating sectioning of a citrus fruit peel by cutting of circular grooves in the opposite end or pole portions of a citrus fruit.

Other objects, features, and advantages of the present invention will be readily apparent from the following description of a preferred embodiment thereof, taken in conjunction with the accompanying drawings, in which:

Figs. 1, 2, and 3 are perspective views of a device according to my invention, the views respectively showing the device in successive stages of the operation of removing the peel from an orange.

In Figs. 1, 2, and 3 the tool 20 is shown in the operational sequence of the steps in the removal of the peel of an orange 22. As there shown, the tool includes a frame having a circularly arranged series of cutting members such as the teeth 24 adapted to be forced into the orange about its stem end with the teeth forced into the peel, the tool is then rotated, as indicated by the arcs A, to cause those teeth 24 to cut a circular groove 26 in the orange about that stem end or pole. The orange is then turned over and the operation is repeated at the flower end or pole. The end caps 28 of the peel, lying within the circular grooves 26, may be then removed, or they may be left in place to protect the meat of the orange until it is ready to be eaten.

Providing the necessary leverage to rotate the tool about the stem-end-cutting teeth 24 is a manipulating handle 32 at one end of which the teeth 24 are carried. The other end of the handle 32 carries a peeling means such as the generally spoon-shaped peeler 34. The handle 32 extends transverse to the axis of the circle defined by the teeth and provides a conveniently graspable means by which the user may apply circular leverage to rotate cutting teeth 24 in the operative step of cutting the circular grooves 26.

Carried by the handle 32 is a cutting member 38 operative as the tool is pulled along the orange surface, indicated by Fig. 2, to cut longitudinal grooves 40 in the orange peel, the grooves thus cut separating the peel into sectors which may be peeled from the orange. To provide retraction of the cutting member 38 into the position shown in Fig. 3, it is carried by the handle 32 in pivotal fashion as by pivot means 41.

In a preferred form, the cutting teeth 24 are provided as integral extensions from the edge of a hollow knob or dome-like, generally semi-spherical head 44 and from the side of which the handle 32 projects. The head 44 is smoothly rounded as shown for comfortably accommodating the application of manipulating pressure by the palm of the user's hand for pressing the teeth 24 into the citrus fruit peel for the formation of the circular grooves 26. The head knob or dome 44 is also useful during the peeling step shown in Fig. 3 for receiving manipulating pressure thereagainst. By having the dome shaped head 44 hollow, the cutting tooth end of the slitter 38 can be swung about the pivot 41 into a retracted or out of the way position into the hollow dome as shown in Fig. 3.

It will be understood that modifications and variations may be effected without departing from the scope of the novel concepts of the present invention.

I claim as my invention:

1. In a citrus fruit peeling device, a dome-shaped portion having a circular series of cutting teeth projecting in generally axial direction from said portion and in the opposite direction from the dome shape thereof, said dome shape accommodating the palm of a manipulating hand for applying manual pressure on the dome, and a manipulating handle projecting from the side of the dome shaped portion and extending transversely to the axis of the circle defined by the teeth and manipulable to afford circular leverage for rotating the teeth in said circle for cutting a circular groove in the peel on the end of a citrus fruit.

2. A citrus fruit peeling device as defined in claim 1 wherein said dome-shaped portion is a hollow shell.

3. A citrus fruit peeling device as defined in claim 1 wherein said dome-shaped portion is of hollow semi-spherical shell-like form with said teeth comprising integral extensions from the edge of the dome-shell.

References Cited in the file of this patent

UNITED STATES PATENTS

| | | |
|---|---|---|
| 473,316 | Hunter | Apr. 19, 1892 |
| 687,820 | Crandall | Dec. 3, 1901 |
| 1,293,351 | Creasey | Feb. 4, 1919 |
| 1,521,311 | Mrabueno | Dec. 30, 1924 |
| 2,032,562 | Burns | Mar. 3, 1936 |
| 2,427,123 | Catellier | Sept. 9, 1947 |
| 2,505,917 | Schumacher | May 2, 1950 |
| 2,528,071 | Marishita et al. | Oct. 31, 1950 |
| 2,549,326 | Moore | Apr. 17, 1951 |